United States Patent
Matsumiya et al.

(10) Patent No.: US 7,490,411 B2
(45) Date of Patent: Feb. 17, 2009

(54) SCREW MEASURING METHOD, SCREW MEASURING PROBE, AND SCREW MEASURING APPARATUS USING THE SCREW MEASURING PROBE

(75) Inventors: Sadayuki Matsumiya, Kawasaki (JP); Masanori Arai, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 41 days.

(21) Appl. No.: 11/712,491

(22) Filed: Mar. 1, 2007

(65) Prior Publication Data
US 2007/0240318 A1 Oct. 18, 2007

(30) Foreign Application Priority Data
Mar. 16, 2006 (JP) ............... 2006-072862

(51) Int. Cl.
G01B 5/08 (2006.01)
G01B 5/20 (2006.01)

(52) U.S. Cl. .................... 33/199 R; 33/504

(58) Field of Classification Search .............. 33/199 B, 33/199 R, 503, 504
See application file for complete search history.

(56) References Cited

U.S. PATENT DOCUMENTS

| | | | | |
|---|---|---|---|---|
| 4,947,555 A | * | 8/1990 | Allen, III | .............. 33/199 R |
| 5,251,154 A | | 10/1993 | Matsumoto et al. | |
| 5,571,222 A | | 11/1996 | Ludwig | |
| 6,145,207 A | * | 11/2000 | Brunson | ................. 33/199 R |
| 6,285,965 B1 | | 9/2001 | Taenzer | |
| 6,460,261 B1 | * | 10/2002 | Noda et al. | ................. 33/503 |
| 2001/0034948 A1 | * | 11/2001 | Matsumiya et al. | ........... 33/553 |

FOREIGN PATENT DOCUMENTS

| | | | |
|---|---|---|---|
| EP | 932017 A1 | * | 7/1999 |
| JP | A 55-113907 | | 9/1980 |
| JP | 02242101 A | * | 9/1990 |
| JP | A 7-294244 | | 11/1995 |
| JP | A 2001-082952 | | 3/2001 |
| JP | 2004020342 A | * | 1/2004 |
| JP | 2004198238 A | * | 7/2004 |
| SU | 1516731 A1 | * | 10/1989 |

* cited by examiner

*Primary Examiner*—Richard A. Smith
(74) *Attorney, Agent, or Firm*—Oliff & Berridge, PLC

(57) ABSTRACT

A screw measuring apparatus comprising: an internal-dimension measuring unit for obtaining internal-dimension information $D_w$ of a female screw placed on a coordinate measuring machine when the stylus-tip sphere having the diameter selected according to the pitch of the female screw is butted against the screw groove of the female screw; and an effective-diameter calculating unit for obtaining effective-diameter information $D_e$ of the female screw from the internal-dimension information $D_w$ obtained by the internal-dimension measuring unit, diameter information $2r$ of the stylus-tip sphere, and thread angle information $\alpha$ and pitch information $P$ of the female screw, by using an effective-diameter calculation expression $D_e = D_w + 2r \times \csc(\alpha/2) - (P/2) \times \cot(\alpha/2)$.

10 Claims, 5 Drawing Sheets

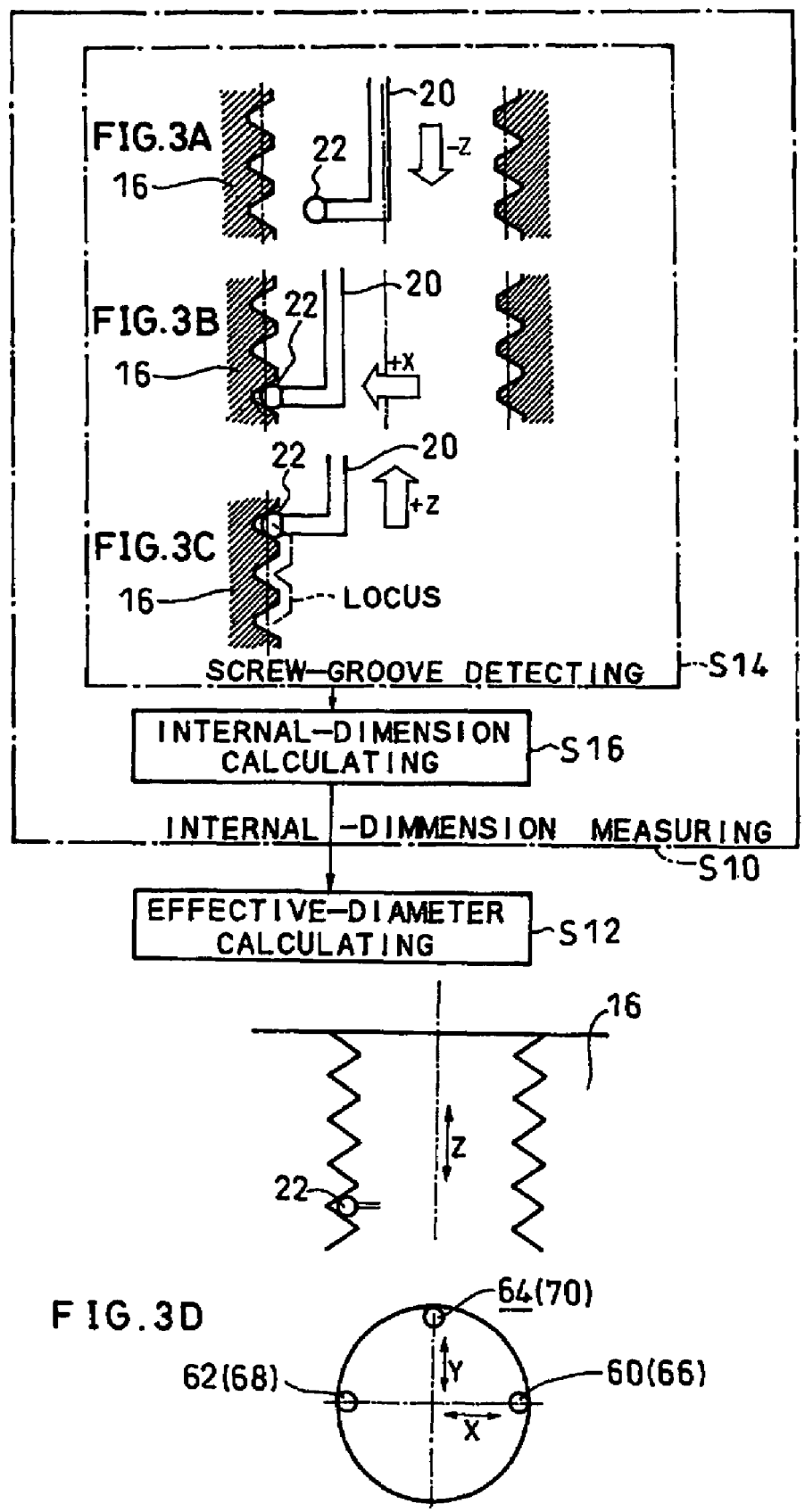

SCREW MEASURING METHOD, SCREW MEASURING PROBE, AND SCREW MEASURING APPARATUS USING THE SCREW MEASURING PROBE

RELATED APPLICATIONS

This application claims priority to the Japanese Patent Application 2006-72862 dated on Mar. 16, 2006 and is hereby incorporated with reference for all purposes.

BACKGROUND OF THE INVENTION

1. Field of the Invention

The present invention relates to screw measuring methods, screw measuring probes, and screw measuring apparatuses using the screw measuring probes, and more particularly, to an improvement of an automatic method (mechanism) for measuring the effective diameter of a female screw.

2. Prior Art

Screws have been conventionally used to clamp various components. Since screws largely affect the quality and life time of the entire product in which the screws are used, it is very important to inspect them to maintain the quality thereof in a manufacturing process for machining them precisely. In screw inspection, characteristic values of the shape of each screw are measured, such as the effective depth, the pitch, the effective diameter, the thread angle, and the threading length.

For example, the three-wire method is often used to measure the effective diameter of a male screw. In the three-wire method, a three-wire gauge is applied to the groove of the male screw, the external dimension is measured with a micrometer, and the effective diameter of the male screw is obtained from the measured external dimension.

Since the three-wire method is a manual measurement method, skill in handling a three-wire gauge is required. Because micrometer readings may differ from operator to operator, it is difficult to maintain measurement precision and the efficiency of the measurement work.

Therefore, simplified measurement has been demanded in the field of screw measurement. To satisfy such a demand, a measurement method of measuring the dimensions of various shape characteristics of screws by the use of a three-dimensional measurement machine has been proposed (such as that disclosed in Japanese Unexamined Patent Application Publication No. 2001-82952).

In the method described in Japanese Unexamined Patent Application Publication No. 2001-82952, a three-dimensional measurement machine subjects a screw to profiling measurement using a probe and applies data processing to the results of the profiling measurement to obtain the dimensions of various shape characteristics of the screw. To obtain the effective diameter of a female screw, a virtual circle is applied to the shape data obtained from the profiling measurement and then, the three-wire method is used.

Even with the method described in Japanese Unexamined Patent Application Publication No. 2001-82952, the accuracy of an effective diameter obtained in automatic measurement needs to be further improved, and in particular, it is difficult to measure the effective diameter of a female screw automatically.

Conventionally, there is no suitable conventional technology to solve this issue. Although a three-dimensional measurement machine has been used to measure the effective diameter of a female screw, an appropriate machine for automatic measurement of the effective diameter of a female screw has not been developed.

SUMMARY OF THE INVENTION

The present invention has been made in view of the foregoing situation. Accordingly, it is an object of the present invention to provide a screw measuring method, a screw measuring probe, and a screw measuring apparatus using the screw measuring probe, all capable of performing accurate automatic measurement of the effective diameter of a female screw.

The present inventors performed extensive examination of automatic measurement of the effective diameters of female screws, found that a combination of the following points largely improves the accuracy of automatic measurement of the effective diameters of female screws, and have thus realized the present invention. Specifically, an internal dimension of a female screw is actually measured with a stylus-tip sphere having a diameter optimal for the pitch of the female screw, and the effective diameter of the female screw is calculated by an effective-diameter calculation expression described below.

<Screw Measuring Method>

In order to achieve the object described above, a screw measuring method according to the present invention includes an internal-dimension measuring step and an effective-diameter calculating step.

The internal-dimension measuring step uses a coordinate measuring machine provided with a screw measuring probe that has a stylus-tip sphere having a diameter selected according to the pitch of a female screw to measure internal-dimension information $D_w$ equal to the diameter of a cylinder having a center axial line identical with the axial line of the female screw and having a wall that passes through the center of the stylus-tip sphere when the stylus-tip sphere is butted against the screw groove of the female screw, based on coordinate information measured while the stylus-tip sphere is butted against the screw groove of the female screw.

The effective-diameter calculating step obtains effective-diameter information $D_e$ of the female screw from the internal-dimension information $D_w$ measured in the internal-dimension measuring step, diameter information $2r$ of the stylus-tip sphere, and thread angle information $\alpha$ and pitch information $P$ of the female screw, by using an effective-diameter calculation expression $D_e = D_w + 2r \times \cosec(\alpha/2) - (P/2) \times \cot(\alpha/2)$.

In the present invention, it is preferred that the internal-dimension measuring step includes a screw-groove detecting step, and an internal-dimension calculating step.

The screw-groove detecting step detects the screw groove at two or more measurement points separated by a predetermined angle circumferentially on the wall surface of the female screw, when the stylus-tip sphere is at a maximum displacement point toward the outside in the radial direction of the female screw while the stylus-tip sphere contacts the wall surface of the female screw and the stylus-tip sphere is made to crawl along the axial line of the female screw, the maximum displacement point being regarded as a point where the stylus-tip sphere completely falls in the screw groove of the female screw.

The internal-dimension calculating step obtains the internal-dimension information $D_w$ according to coordinate information on each screw groove detected in the screw-groove detecting step.

<Screw Measuring Probe>

In order to achieve the object described above, a screw measuring probe according to the present invention, provided for a coordinate measuring machine and used for measuring the effective diameter of a female screw, includes a probe body, a stylus, and a detector.

The probe body is provided in a movable manner relative to a female screw placed on the coordinate measuring machine;

The stylus comprises a stylus shaft provided for the probe body and a stylus-tip sphere provided at a tip of the stylus shaft and having a diameter selected according to the pitch of the female screw.

The detector is provided for the probe body or the stylus, detects coordinate information related to the female screw.

In the present invention, it is preferred that the diameter $2r$ of the stylus-tip sphere is given by an expression $2r=P/(2\cos\alpha/2)$, where P indicates the pitch of the female screw and $\alpha$ indicates the thread angle of the female screw.

The inventors found that, when actually measuring the effective diameter of a female screw with a stylus having a stylus-tip sphere, the stylus-tip sphere is tilted in the directions of the lead angle of the screw thread and sometimes contacts not the slope of the screw thread in a cross-sectional plane of the axis of the female screw but a point shifted from the cross-sectional plane of the female screw. Since elastic deformation may occur between the stylus-tip sphere, and the screw thread and measurement plane, it was confirmed that an error could occur in a measurement result obtained when the stylus-tip sphere actually made contact with the female screw. It was also confirmed that an error could occur in a parameter included in the female-screw effective-diameter calculation expression. The present inventors found that it is very important to reduce the influence of an error that would adversely affect the measurement result of the effective diameter of the female screw in order to dramatically increase the accuracy of automatic measurement of the effective diameter of the female screw. It was found that, when an optimal diameter was selected for the stylus-tip sphere, especially when the stylus-tip sphere had a diameter $2r$ represented by the expression $2r=P/(2\cos\alpha/2)$, the influence of the error on the measurement result obtained when the stylus-tip sphere actually made contact with the female screw was largely reduced.

In the present invention, it is preferred that the stylus shaft comprises a body-side stylus shaft portion and a tip-side stylus shaft portion.

The body-side stylus shaft portion has a stylus axial line identical with the axial line of the female screw.

The tip-side stylus shaft portion perpendicular to the body-side stylus shaft portion, has a stylus axial line parallel to detection directions of the coordinate information, and has the stylus-tip sphere at a tip.

In the present invention, it is preferred that the detector comprises a strain gauge or a scale.

The strain gauge or the scale is provided for the probe body or the stylus shaft, detects the coordinate information related to the female screw.

<Screw Measuring Apparatus>

In order to achieve the object described above, a screw measuring apparatus according to the present invention includes the screw measuring probe, a coordinate measuring machine, an internal-dimension measuring unit, and an effective-diameter calculating unit.

The coordinate measuring machine in which the female screw is placed such that the female screw and the screw measuring probe move relatively to each other, is used.

The internal-dimension measuring unit obtains internal-dimension information $D_w$ equal to the diameter of a cylinder having a center axial line identical with the axial line of the female screw and having a wall that passes through the center of the stylus-tip sphere when the stylus-tip sphere is butted against the screw groove of the female screw, based on coordinate information measured while the stylus-tip sphere is butted against the screw groove of the female screw.

The effective-diameter calculating unit obtains effective-diameter information $D_e$ of the female screw from the internal-dimension information $D_w$ obtained by the internal-dimension measuring unit, diameter information $2r$ of the stylus-tip sphere, and thread angle information $\alpha$ and pitch information P of the female screw, by using an effective-diameter calculation expression $D_e=D_w+2r\times\mathrm{cosec}(\alpha/2)-(P/2)\times\cot(\alpha/2)$.

The effective diameter of a female screw means the average of diameters obtained from portions where a male screw and the female screw contact. In other words, the effective diameter of the female screw equals the diameter of a cylinder whose wall passes through points where the thread width and the groove width are equal in the female screw.

In the present invention, the number of threads can be used instead of the pitch P.

<Advantages of the present invention>

A screw measuring method of the present invention includes an internal-dimension measuring step of measuring an internal dimension by actually butting a stylus-tip sphere having a diameter corresponding to the pitch of a female screw against the screw groove of the female screw, and an effective-diameter calculating step of obtaining the effective diameter of the female screw by using an effective-diameter calculation expression. Therefore, the effective diameter of the female screw can be automatically measured accurately.

According to a screw measuring probe of the present invention, a stylus-tip sphere having a diameter corresponding to the pitch of a female screw is provided. Therefore, the effective diameter of the female screw can be automatically measured accurately.

In the screw measuring probe of the present invention, when the diameter $2r$ of the stylus-tip sphere is given by the expression $2r=P/(2\cos\alpha/2)$, where P indicates the pitch of the female screw and $\alpha$ indicates the thread angle of the female screw, the effective diameter of the female screw can be automatically measured more accurately.

When the screw measuring probe of the present invention has an L-shaped stylus or a cross-shaped stylus, the effective diameter of the female screw can be automatically measured more easily.

According to a screw measuring apparatus of the present invention, a screw measuring probe according to the present invention, a coordinate measuring machine, an internal-dimension measuring unit for obtaining an internal dimension by actually butting the screw measuring probe against the screw groove of a female screw, and an effective-diameter calculating unit for obtaining the effective diameter of the female screw by using an effective-diameter calculation expression are provided. Therefore, the effective diameter of the female screw can be automatically measured accurately.

BRIEF DESCRIPTION OF THE DRAWINGS

FIG. 3A to FIG. 3C show a flowchart of a processing procedure of a screw measuring method according to the embodiment. FIG. 3D shows measurement points.

DESCRIPTION OF THE PREFERRED EMBODIMENT

Figure 1:
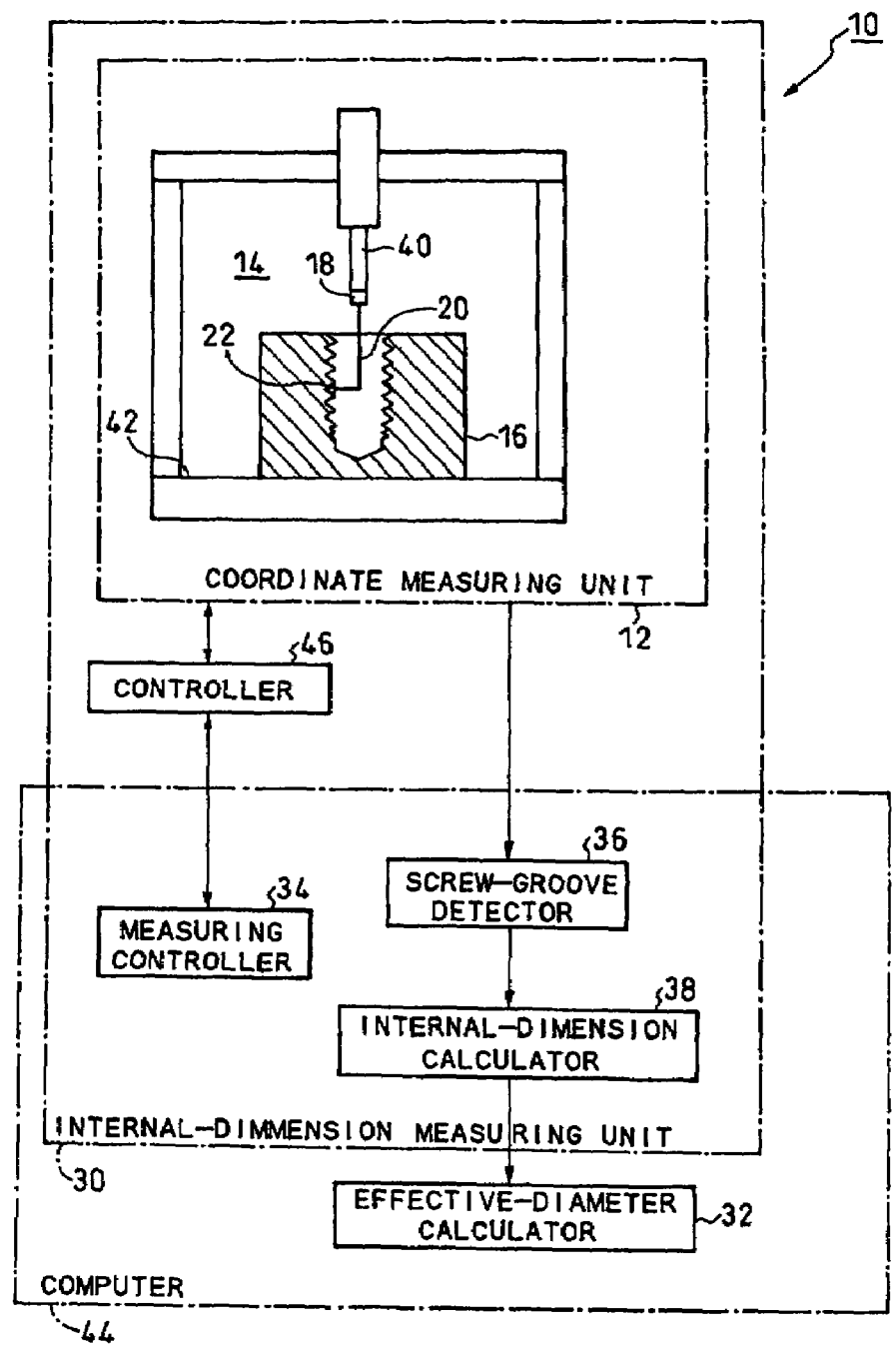
FIG. 1 is a view showing an outline structure of a screw measuring apparatus according to an embodiment of the present invention.

A preferred embodiment of the present invention will be described below by referring to the drawings.

FIG. 1 shows an outline structure of a screw measuring apparatus 10 that uses a screw measuring method according to an embodiment of the present invention.

In FIG. 1, the screw measuring apparatus 10 includes a coordinate measuring unit 12 and a screw measuring probe 14.

The coordinate measuring unit 12 is formed of a computer-numerical-control (CNC) three-dimensional measuring unit. A female screw 16 is placed in the coordinate measuring unit 12. The female screw 16 and the screw measuring probe 14 can be moved relatively to each other.

The screw measuring probe 14 is attached to the coordinate measuring unit 12. The screw measuring probe 14 is formed of a probe body 18 and a stylus 20.

The probe body 18 is provided so as to be movable relatively to the female screw 16, placed in the coordinate measuring unit 12. The probe body 18 detects coordinate information on the female screw 16.

The stylus 20 is attached to the probe body 18. The stylus 20 has a stylus-tip sphere 22 at the tip of the stylus 20. The stylus-tip sphere 22 has an optimal diameter selected according to the pitch of the female screw 16.

In the present embodiment, the screw measuring probe, which includes the stylus 20, serves as a profiling probe. While the stylus-tip sphere 22 of the probe is butt against the wall surface of the female screw and is moved along the axis of the female screw, coordinate information about the wall surface of the female screw is obtained at constant intervals to measure the female-screw shape characteristics.

The screw measuring apparatus 10 also includes an internal-dimension measuring unit 30 and an effective-diameter calculator 32.

In an internal-dimension measuring process, the internal-dimension measuring unit 30 calculates internal-dimension information $D_w$ from the coordinate information obtained when the stylus-tip sphere 22, having a diameter selected according to the pitch of the female screw 16, is butt against the groove of the female screw 16. This internal-dimension information $D_w$ is equal to the diameter of a cylinder having the same center axial line as the female screw 16 and having a wall that passes through the center of the stylus-tip sphere 22 when the stylus-tip sphere 22 is butt against the groove of the female screw 16.

In an effective-diameter calculating process, the effective-diameter calculator 32 calculates effective-diameter information $D_e$ of the female screw 16 from the internal-dimension information $D_w$ calculated by the internal-dimension measuring unit 30, diameter information $2r$ of the stylus-tip sphere 22, and thread-angle information $\alpha$ and pitch information $P$ of the female screw 16. Specifically, the effective-diameter information $D_e$ is obtained by the following effective-diameter calculation expression:

$$D_e = D_w + 2r \times \csc(\alpha/2) - (P/2) \times \cot(\alpha/2).$$

The internal-dimension measuring unit 30 includes a measurement controller 34, a screw-groove detector 36, and an internal-dimension calculator 38.

The measurement controller 34 specifies movement along each axis and controls measurement operations in the coordinate measuring unit 12. The measurement controller 34 controls the coordinate measuring unit 12 such that the stylus-tip sphere 22 is made to crawl on the wall surface of the female screw 16 along the screw axis to detect the maximum displacement of the stylus-tip sphere 22 in the outer radial direction of the female screw 16.

In a screw-groove detecting process, the screw-groove detector 36 performs screw-groove detection at two or more (for example, three) measurement positions separated by a predetermined angle in the circumferential direction on the wall surface of the female screw 16. In the screw-groove detection, based on coordinate information obtained when the stylus-tip sphere 22 is made to crawl on the wall surface of the female screw 16 along the screw axis, the maximum displacement of the stylus-tip sphere 22 in the outer radial direction of the female screw 16. It is assumed that the stylus-tip sphere 22 is completely fitted in the screw groove of the female screw 16 at the maximum displacement.

In an internal-dimension calculating process, the internal-dimension calculator 38 obtains the internal-dimension information $D_w$ from coordinate information of each screw groove detected by the screw-groove detector 36. The internal-dimension information $D_w$ indicates the diameter of the cylinder.

In order to perform relative movement between the screw measuring probe 14 and the female screw 16 in the axial-line directions (Z-axis directions) of the female screw 16 and the directions (X and Y axis directions) perpendicular to the axial line of the female screw 16, the screw measuring probe 14 is attached to a Z-axis spindle 40 of the coordinate measuring unit 12. The screw measuring probe 14 can be moved relative to the coordinate measuring unit 12 in the X, Y, and Z axis directions. In order to make the Z axis directions of the coordinate measuring unit 12 and the axial-line directions of the female screw 16 parallel, the female screw 16 is placed on a table 42 of the coordinate measuring unit 12.

A computer 44 and a controller 46 are provided to make the screw measuring apparatus 10 automatically execute each of the above-described processes.

The computer 44 controls the operation of the coordinate measuring unit 12 and performs data processing.

The controller 46 is provided between the computer 44 and the coordinate measuring unit 12 and operates the coordinate measuring unit 12 according to instructions sent from the computer 44.

The outline configuration of the screw measuring apparatus 10 is as described above. The operation thereof will be described below.

Figure 2:
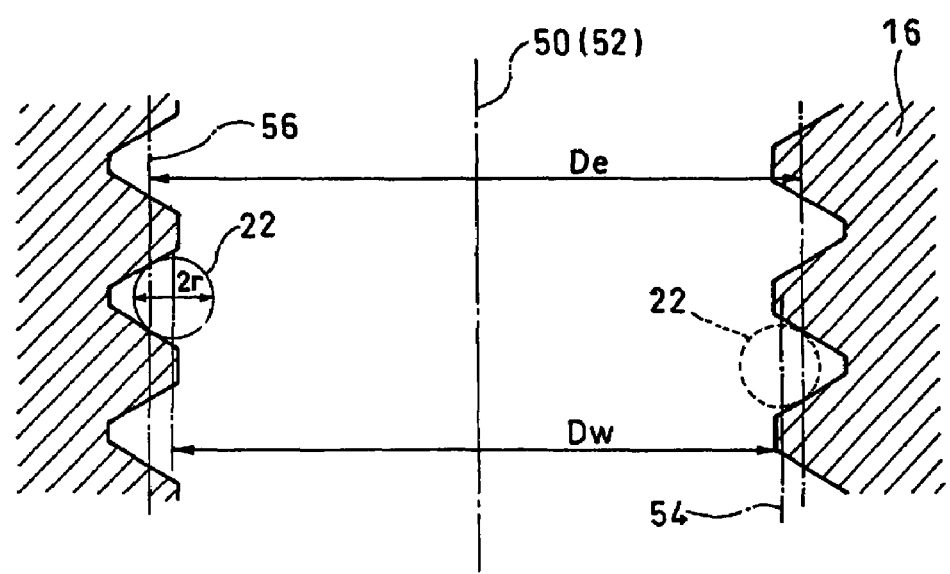
FIG. 2 is a view showing an internal dimension and an effective diameter of a female screw in the embodiment.

In the present embodiment, the internal dimension $D_w$, shown in FIG. 2, is measured with the screw measuring probe, having the stylus at the tip of which the stylus-tip sphere 22 having the diameter selected according to the pitch of the female screw is attached. FIG. 2 is a cross-sectional view of a part of the female screw 16, including the axial line 50 of the female screw 16. The effective diameter $D_e$ of the female screw 16 is obtained by the above-described effective-diameter calculation expression.

The internal dimension $D_w$ of the female screw 16 is equal to the diameter of a cylinder 54 having a center axial line 52 identical with the axial line 50 of the female screw 16 and having the wall surface that passes through the center of the stylus-tip sphere 22 when the stylus-tip sphere 22 having a diameter of 2 r is butted against the screw groove of the female screw 16.

The effective diameter $D_e$ of the female screw 16 is equal to the diameter of a cylinder 56 having the wall surface that passes through points of the female screw 16, where the width of the thread and the width of the groove match.

As shown in FIG. 3, an internal-dimension measuring process S10 and an effective-diameter calculating process S12 are provided.

In the internal-dimension measuring process S10, the internal-dimension information $D_w$ is obtained from coordinate information measured when the stylus-tip sphere 22 is butted against the female screw 16. The internal dimension $D_w$ is equal to the diameter of a cylinder having a center axial line identical with the axial line 50 of the female screw 16 and having the wall surface that passes through the center of the stylus-tip sphere 22 when the stylus-tip sphere 22 is butted against the screw groove of the female screw 16.

In the effective-diameter calculating process S12, the effective-diameter information $D_e$ of the female screw 16 is obtained from the internal-dimension information $D_w$ calculated in the internal-dimension measuring process S10, diameter information 2 r of the stylus-tip sphere 22, and thread-angle information α and pitch information P of the female screw 16. Specifically, the effective-diameter information $D_e$ is obtained by the following effective-diameter calculation expression:

$$D_e = D_w + 2r \times \csc(\alpha/2) - (P/2) \times \cot(\alpha/2).$$

The internal-dimension measuring process S10 is formed of a screw-groove detecting process S14 and an internal-dimension calculating process S16.

In the internal-dimension measuring process S10, while the stylus-tip sphere 22 is in contact with the wall surface of the female screw 16, when the stylus-tip sphere 22 is made to crawl in the axial directions of the female screw 16, the maximum displacement of the stylus-tip sphere 22 in the outer radial direction (X direction or Y direction) of the female screw 16 is detected. It is assumed that the stylus-tip sphere 22 is completely fitted in the screw groove (valley) of the female screw 16 at the maximum displacement.

More specifically, the stylus 20 is inserted into the screw hole of the female screw 16 in the screw-groove detecting process S14, as shown in FIG. 3A.

Then, the stylus-tip sphere 22 is pushed into a perfectly threaded portion, for example, the fourth screw-valley from the top of the screw hole of the female screw 16, as shown in FIG. 3B.

The wall surface of the screw hole is traced with the stylus-tip sphere 22, as shown in FIG. 3C. While the stylus-tip sphere 22 is pushed against the wall surface of the screw hole, the stylus-tip sphere 22 is moved along the axial line of the female screw 16 (along the Z axis). It is assumed that the stylus-tip sphere 22 completely falls in the screw groove (valley) of the female screw 16 at the maximum displacement toward the outside in the radial direction of the screw hole.

This measurement is performed at three or more points separated in the circumferential direction on the wall surface of the screw hole. As shown in FIG. 3D, in a view from the top of the screw hole, the measurement is performed at three measurement points 60, 62, and 64, separated in the circumferential direction of the screw groove.

Based on coordinate information at screw groove portions 66, 68, and 70 at the measurement points 60, 62, and 64 detected in the screw-groove detecting process S14, the diameter of the cylinder is acquired to obtain the internal-dimension information $D_w$ in the internal-dimension calculating process S16.

The effective diameter $D_e$ is obtained by the effective-diameter calculation expression from the internal dimension $D_w$, measured with the stylus-tip sphere 22 being actually butted against the female screw 16.

As a result, the effective diameter of a female screw can be automatically measured more accurately in the present invention than in a case where a combination of an actual internal-dimension measurement, with the stylus-tip sphere having a diameter optimal to the pitch of the female screw, and effective-diameter calculation by the use of the effective-diameter calculation expression is not taken into account.

For example, the effective diameter of a female screw can be automatically measured accurately with a CNC three-dimensional measuring machine.

Since measurement is performed automatically, the present invention provides higher measurement efficiency than in manual measurement with a female-screw gauge.

When measurement of the effective diameter of a female screw according to the present invention is performed in a manufacturing process for machining female screws at high precision, quantitative management of the effective diameters of the female screws can be performed accurately and easily.

<Measurement Accuracy>

To measure the effective diameter of a female screw automatically and more accurately, it is preferred that the diameter 2 r of the stylus-tip sphere 22 of the screw measuring probe 14 satisfy the expression $2r = P/(2 \cos \alpha/2)$.

Specific preferred examples of the relationship between the diameter (2 r) of the stylus-tip sphere 22 and the metric-screw pitch (P) of the female screw 16 (and the number (N) of unified-screw threads) will be indicated below.

TABLE 1

| | 2r (mm) | | | | | | | | |
|---|---|---|---|---|---|---|---|---|---|
| | 0.1155 | 0.1443 | 0.1732 | 0.2021 | 0.2309 | 0.2598 | 0.2887 | 0.3464 | 0.4041 |
| P (mm) | 0.2 | 0.25 | 0.3 | 0.35 | 0.4 | 0.45 | 0.5 | 0.6 | 0.7 |
| N | — | — | 80 | 72 | 64 | 56 | 48 | 44, 40 | 36 |
| | 2r (mm) | | | | | | | | |
| | 0.4330 | 0.4619 | 0.5196 | 0.5774 | 0.7217 | 0.7536 | 0.7964 | 0.8949 | 1.0227 |
| P (mm) | 0.75 | 0.8 | — | 1 | 1.25 | — | — | 1.5 | 1.75 |
| N | — | 32 | 28 | 24 | 20 | — | 18 | 16 | 14 |

TABLE 1-continued

| | 2r (mm) | | | | | | | |
|---|---|---|---|---|---|---|---|---|
| | 1.1547 | 1.1932 | 1.3016 | 1.4434 | 1.5908 | 1.7897 | 2.0454 | 2.3863 | 2.5981 |
| P (mm) | 2 | — | — | 2.5 | — | 3 | 3.5 | 4 | 4.5 |
| N | 13 | 12 | 11 | 10 | 9 | 8 | 7 | 6 | — |

| | 2r (mm) | | | |
|---|---|---|---|---|
| | 2.8868 | 3.1817 | 3.4641 | 3.594 |
| P (mm) | 5 | 5.5 | 6 | — |
| N | 5 | 4½ | — | 4 |

According to the present invention, only when the diameter 2 r of the stylus-tip sphere 22 is optimized according to the shape of the female screw 16 and effective-diameter calculation is also performed with the use of the effective-diameter calculation expression, the effective diameter of the female screw 16 can be automatically measured with highly-increased accuracy. In other words, when the diameter 2 r of the stylus-tip sphere 22 is taken into account, the accuracy of the effective-diameter measurement can be significantly improved compared with a case where the diameter 2 r of the stylus-tip sphere 22 is not taken into account.

Even conventionally, as disclosed in Japanese Unexamined Patent Application Publication No. 2001-82952, screw-shape measurement can be performed with a three-dimensional measuring machine. There is, however, room for improvement in accuracy of female-screw effective diameter measurement. Conventionally, there is also no appropriate technology to solve this issue.

The present inventors performed extensive examination of automatic measurement of female-screw effective diameters and found the following points.

In conventional screw-shape measurement using a three-dimensional measuring machine, measurement is basically performed with image processing. From profiling measurement results, a virtual screw shape is generated. In image processing, a virtual three-wire gauge is applied to the virtual screw shape to obtain the effective diameter of the screw, which is usually performed in the field.

It was also found that a measurement error occurred when actual screw measurement was shifted to virtual screw measurement performed with image processing.

More specifically, an error might occur when an actual female-screw shape is converted (changed by approximation) to a virtual female-screw shape. In addition, an error might occur when an actual shape of a stylus-tip sphere is changed by approximation to a virtual shape of the stylus-tip sphere. Therefore, actual measurement performed when the stylus-tip sphere contacts with the actual female screw differs from simulation performed with contact between a virtual female-screw shape and a viral shape of the stylus-tip sphere.

Even though an error occurs between the actual screw measurement and the virtual screw measurement, correcting the error has not been taken into account conventionally. In addition, such a correction is very difficult to perform. It was found that the error could have prevented an improvement in accuracy when the effective diameter of a female screw was performed by the use of a three-dimensional measuring machine.

To improve accuracy in the automatic measurement of the effective diameter of a female screw with the use of a three-dimensional measuring machine, the present inventors found that the combination of the following points is very effective. Specifically, without performing virtual screw measurement, an internal dimension of a female screw is measured while a screw measuring probe of a three-dimensional measuring machine is actually butted against the female screw, and the effective diameter of the female screw is calculated by the above-described effective-diameter calculation expression.

The present inventors also found that, just by direct measurement of an internal dimension, it was difficult to improve the accuracy to a desired level. The present inventors found that it is very effective to use a screw measuring probe that has a stylus-tip sphere having an optimal diameter which is selected such that the influence of an error that would adversely affect the measurement result of the effective diameter of a female screw is minimized. As a result of these findings, the present inventors have completed the present invention.

Some details of the reasons of improving accuracy in female-screw effective diameter measurement have not yet been known. The present inventors think that, since an internal dimension of a female screw is actually measured by using a screw measuring probe that has a stylus-tip sphere having an optimal diameter which is selected such that the influence of an error that would adversely affect the measurement result of the effective diameter of the female screw is minimized, reproducibility (accuracy) in appropriate contact position of the stylus-tip sphere on the screw groove (valley) of the female screw is improved.

<Facilitating Measurement>

It is also very important to design the shape of the stylus used, in order to make the measurement of the effective diameter of a female screw easier.

In the measurement of the effective diameter of a female screw, because the stylus-tip sphere contacts the screw groove (valley) of the female screw, it is important that the stylus shaft should not interfere with the thread.

<L-Shaped Stylus>

Figure 4A:
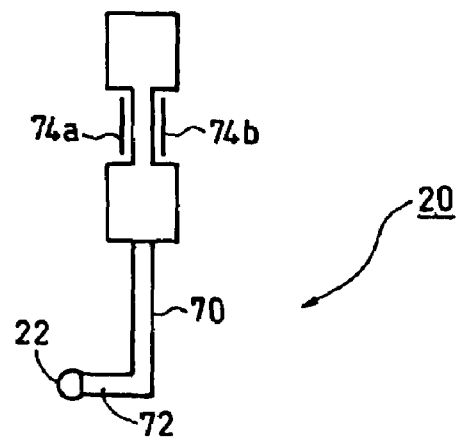
FIG. 4A to FIG. 4C show a screw measuring probe having an L-shaped stylus in the embodiment.
Figure 4B:
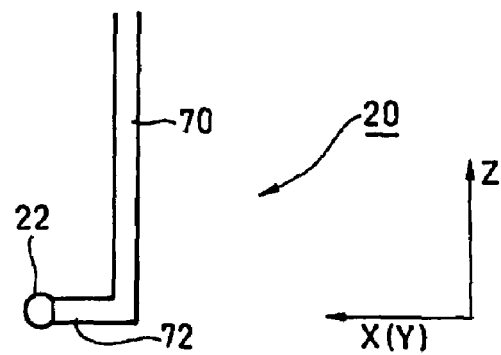
Figure 4C:
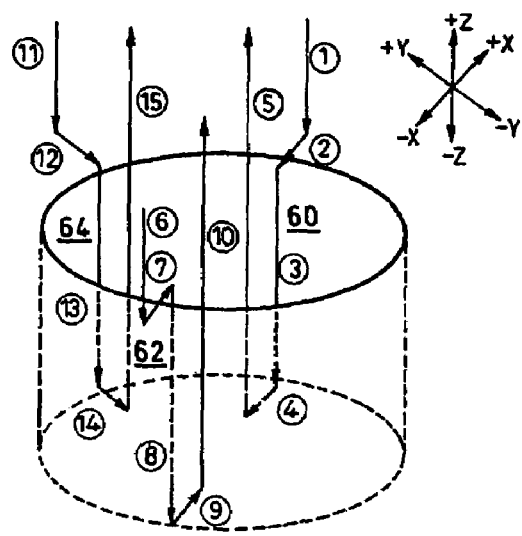

An L-shaped stylus 20 shown in FIG. 4A to FIG. 4C, which is very important, is employed.

FIG. 4A shows the whole of the L-shaped stylus 20. FIG. 4B is an enlarged view of the L-shaped stylus 20. FIG. 4C shows a measurement procedure with the L-shaped stylus 20.

The stylus 20 preferably has an L shape, as shown in FIG. 4A. The L-shaped stylus 20 includes a body-side stylus shaft 70 and a tip-side stylus shaft 72. The body-side stylus shaft 70 has a stylus axial line that matches the axial line of the female screw. The tip-side stylus shaft 72 is perpendicular to the body-side stylus shaft 70 and has a stylus-tip sphere 22 at its tip.

In FIG. 4A, it is preferred that the detector include strain gauges 74a and 74b in order to automatically measure the effective diameter of a female screw more appropriately. The strain gauges 74a and 74b are provided for the body-side stylus shaft 70. The strain gauges 74a and 74b detect strain information (direction and displacement) in the directions of the tip-side stylus shaft 72.

Based on the strain information detected by the strain gauges 74a and 74b, coordinate information (for example, position information or displacement information) of the stylus-tip sphere 22 in a radial direction of the female screw (along the X axis or the Y axis) is detected.

When measurement is finished at a measurement point, the screw measuring probe can be rotated to perform the same measurement at three or more measurement points easily with the use of the L-shaped stylus, shown in FIG. 4A to FIG. 4C.

When measurement is performed at three measurement points 60, 62, and 64 shown in FIG. 4C, for example, an internal dimension can be measured very accurately and easily. Therefore, the effective diameter of the female screw can be measured very accurately and easily.

<Cross-Shaped Stylus>

Figure 5A:
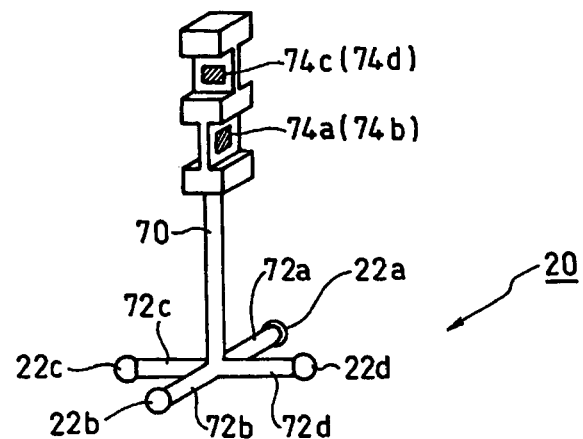
FIG. 5A to FIG. 5C show a screw measuring probe having a cross-shaped stylus in the embodiment.
Figure 5B:
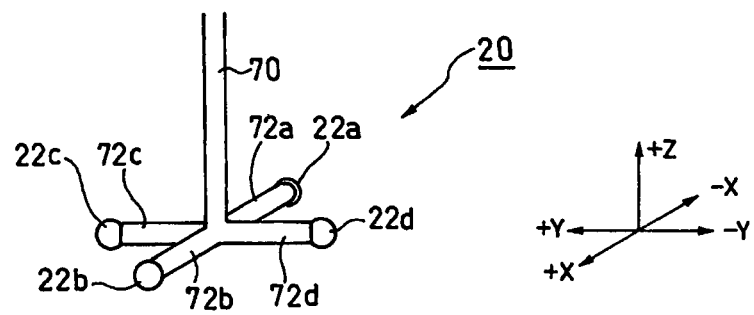
Figure 5C:
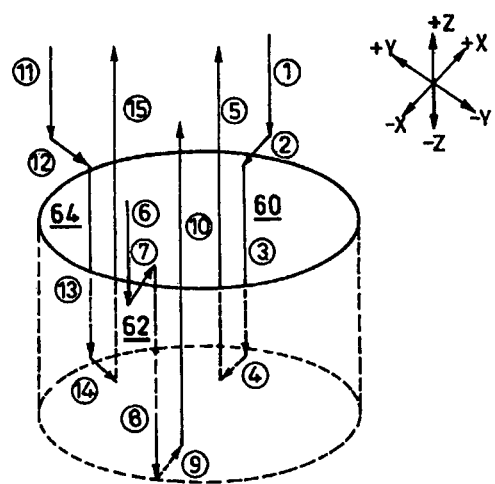

It is also important that a cross-shaped stylus shown in FIG. 5A to FIG. 5C be employed instead of the L-shaped stylus.

FIG. 5A shows the whole of the cross-shaped stylus. FIG. 5B is an enlarged view of the cross-shaped stylus. FIG. 5C shows a measurement procedure with the cross-shaped stylus.

As shown in FIG. 5A to FIG. 5C, it is also preferred that the stylus have a cross shape such that the stylus-tip sphere does not interfere with the thread when the stylus-tip sphere contacts the screw groove (valley) of the female screw in measurement. The cross-shaped stylus includes a body-side stylus shaft 70 and four tip-side stylus shafts 72a, 72b, 72c, and 72d. The body-side stylus shaft 70 extends in the axial-line directions of the female screw. The tip-side stylus shafts 72a, 72b, 72c, and 72d are respectively perpendicular to the body-side stylus shaft 70 and are separated from each other by 90 degrees in a plane perpendicular to the axial-line directions of the female screw.

It is also preferred in the screw measuring probe having the cross-shaped stylus shown in FIG. 5A that strain gauges be included as detectors in order to automatically measure the effective diameter of a female screw more appropriately.

In FIG. 5A, strain gauges 74a and 74b for detecting strain information along the X axis and strain gauges 74c and 74d for detecting strain information along the Y axis are provided in an example case.

With the use of the cross-shaped stylus shown in FIG. 5A to FIG. 5C, measurement can be easily performed at four measurement points without rotating the screw measuring probe.

As shown in FIG. 5C, for example, without rotating the screw measuring probe, measurement at a measurement point 60 with the use of a stylus-tip sphere 22a, measurement at a measurement point 62 with the use of a stylus-tip sphere 22b, and measurement at a measurement point 64 with the use of a stylus-tip sphere 22c can be sequentially performed.

Like the above-described L-shaped stylus, the cross-shaped stylus shown in FIG. 5A to FIG. 5C allows very-accurate and easy measurement of an internal dimension. Therefore, the effective diameter is also measured accurately and more easily.

Since the cross-shaped stylus allows quick measurement at more measurement points without rotating the stylus, it can perform measurement more efficiently than the L-shaped stylus.

Instead of the strain gauges, scales are also preferably used as detectors.

In the above embodiment, a case in which the profiling measurement process with the profiling probe is used has been described. The present invention is not limited to this case. It is also preferred that a touching probe be used for point measurement.

In the above embodiment, a case in which a virtual cylinder is obtained from coordinate information on a female screw and an internal dimension of the female screw is obtained from the diameter of the cylinder has been described. The present invention is not limited to this case. It is also preferred that the internal dimension be directly obtained. Specifically, the distance between the center position of the stylus-tip sphere obtained when the stylus-tip sphere is butted against the screw groove (valley) of the female screw at a first measurement point, and the center position of the stylus-tip sphere obtained when the stylus-tip sphere is butted against the screw groove (valley) at a second measurement point opposite the first measurement point, separated by 180 degrees with respect to the axial line of the female screw, is obtained to directly acquire the internal dimension.

Therefore, the effective diameter of a female screw can be directly calculated by direct measurement with a screw measuring probe having a stylus-tip sphere that has an optimal diameter selected according to the pitch of the female screw, without obtaining a large amount of shape data. In this way, the accuracy of automatic measurement of the effective diameter of a female screw with the use of a three-dimensional measuring machine can be more largely improved.

A screw measuring probe that includes a stylus-tip sphere having a diameter selected according to the pitch of a female screw and effective-diameter calculation by the above-described effective-diameter calculation expression according to the present invention can be applied to the technology disclosed in Japanese Unexamined Patent Application Publication No. 2001-82952 to measure screw-shape characteristics other than the effective diameter of the female screw, such as the effective diameter and effective depth of a male screw.

What is claimed is:

1. A screw measuring method comprising:
   an internal-dimension measuring step of using a coordinate measuring machine provided with a screw measuring probe that has a stylus-tip sphere having a diameter selected according to the pitch of a female screw to measure internal-dimension information $D_w$ equal to the diameter of a cylinder having a center axial line identical with the axial line of the female screw and having a wall that passes through the center of the stylus-tip sphere when the stylus-tip sphere is butted against the screw groove of the female screw, based on coordinate information measured while the stylus-tip sphere is butted against the screw groove of the female screw; and
   an effective-diameter calculating step of obtaining effective-diameter information $D_e$ of the female screw from the internal-dimension information $D_w$ measured in the internal-dimension measuring step, diameter information $2r$ of the stylus-tip sphere, and thread angle information $\alpha$ and pitch information $P$ of the female screw, by using an effective-diameter calculation expression $D_e = D_w + 2r \times \csc(\alpha/2) - (P/2) \times \cot(\alpha/2)$.

2. A screw measuring method according to claim 1, wherein the internal-dimension measuring step comprises:
   a screw-groove detecting step of detecting the screw groove at two or more measurement points separated by a predetermined angle circumferentially on the wall surface of the female screw, when the stylus-tip sphere is at a maximum displacement point toward the outside in the radial direction of the female screw while the stylus-tip sphere contacts the wall surface of the female screw and the stylus-tip sphere is made to crawl along the axial line of the female screw, the maximum displacement point being regarded as a point where the stylus-tip sphere completely falls in the screw groove of the female screw; and
   an internal-dimension calculating step of obtaining the internal-dimension information $D_w$ according to coordinate information on each screw groove detected in the screw-groove detecting step.

3. A screw measuring apparatus for measuring the effective diameter of a female screw, comprising:
   a screw measuring probe provided for a coordinate measuring machine and used for measuring the effective diameter of a female screw;
   a coordinate measuring machine in which the female screw is placed such that the female screw and the screw measuring probe move relatively to each other;
   an internal-dimension measuring unit for obtaining internal-dimension information $D_w$ equal to the diameter of a cylinder having a center axial line identical with the axial line of the female screw and having a wall that passes through the center of the stylus-tip sphere when the stylus-tip sphere is butted against the screw groove of the female screw, based on coordinate information measured while the stylus-tip sphere is butted against the screw groove of the female screw; and
   an effective-diameter calculating unit for obtaining effective-diameter information $D_e$ of the female screw from the internal-dimension information $D_w$ obtained by the internal-dimension measuring unit, diameter information $2r$ of the stylus-tip sphere, and thread angle information $\alpha$ and pitch information $P$ of the female screw, by using an effective-diameter calculation expression $D_e = D_w + 2r \times \mathrm{cosec}(\alpha/2) - (P/2 \times \cot(\alpha/2))$;
   wherein the screw measuring probe further comprises:
   a probe body provided in a movable manner relative to a female screw placed on the coordinate measuring machine,
   a stylus comprising a stylus shaft provided for the probe body and a stylus-tip sphere provided at a tip of the stylus shaft and having a diameter selected according to the pitch of the female screw, and
   a detector provided for the probe body or the stylus, for detecting coordinate information related to the female screw.

4. A screw measuring apparatus according to claim 3, wherein the diameter $2r$ of the stylus-tip sphere is given by an expression $2r = P/(2 \cos \alpha/2)$,
   where P indicates the pitch of the female screw and $\alpha$ indicates the thread angle of the female screw.

5. A screw measuring apparatus according to claim 4, wherein the stylus shaft comprises:
   a body-side stylus shaft portion having a stylus axial line identical with the axial line of the female screw; and
   a tip-side stylus shaft portion perpendicular to the body-side stylus shaft portion, having a stylus axial line parallel to detection directions of the coordinate information, and having the stylus-tip sphere at a tip.

6. A screw measuring apparatus according to claim 5, wherein the detector comprises a strain gauge or a scale provided for the probe body or the stylus shaft, for detecting the coordinate information related to the female screw.

7. A screw measuring apparatus according to claim 4, wherein the detector comprises a strain gauge or a scale provided for the probe body or the stylus shaft, for detecting the coordinate information related to the female screw.

8. A screw measuring apparatus according to claim 3, wherein the stylus shaft comprises:
   a body-side stylus shaft portion having a stylus axial line identical with the axial line of the female screw; and
   a tip-side stylus shaft portion perpendicular to the body-side stylus shaft portion, having a stylus axial line parallel to detection directions of the coordinate information, and having the stylus-tip sphere at a tip.

9. A screw measuring apparatus according to claim 8, wherein the detector comprises a strain gauge or a scale provided for the probe body or the stylus shaft, for detecting the coordinate information related to the female screw.

10. A screw measuring apparatus according to claim 3, wherein the detector comprises a strain gauge or a scale provided for the probe body or the stylus shaft, for detecting the coordinate information related to the female screw.

* * * * *